United States Patent [19]
Schroll

[11] 3,855,002
[45] Dec. 17, 1974

[54] LIQUID ELECTROLYTE FUEL CELL WITH GAS SEAL

[75] Inventor: Craig R. Schroll, West Hartford, Conn.

[73] Assignee: United Aircraft Corporation, East Hartford, Conn.

[22] Filed: Dec. 21, 1973

[21] Appl. No.: 427,181

[52] U.S. Cl. ............................... 136/86 R, 136/133
[51] Int. Cl. ......................................... H01m 27/02
[58] Field of Search ............. 136/86, 146, 153, 133

[56] References Cited
UNITED STATES PATENTS

| | | | |
|---|---|---|---|
| 3,216,911 | 11/1965 | Kronenberg | 136/86 E X |
| 3,276,910 | 10/1966 | Grasselli et al. | 136/86 F |
| 3,404,041 | 10/1968 | Inami | 136/146 |
| 3,436,272 | 4/1969 | Gelting | 136/86 R |
| 3,438,814 | 4/1969 | White | 136/86 B |
| 3,531,329 | 9/1970 | Selwitz | 136/86 D X |
| 3,723,186 | 3/1973 | Borucka et al. | 136/153 |

FOREIGN PATENTS OR APPLICATIONS 1,174,765  12/1969  Great Britain .................... 136/86 R

*Primary Examiner*—A. B. Curtis
*Attorney, Agent, or Firm*—Richard N. James

[57] ABSTRACT

Escape of reactant gases from a fuel cell is prevented by sandwiching an electrolyte-saturated matrix between a separator plate and an electrode, utilizing the electrode for support and the electrolyte itself to provide a wet capillary seal against the escape of gas.

2 Claims, 2 Drawing Figures

LIQUID ELECTROLYTE FUEL CELL WITH GAS SEAL

BACKGROUND OF THE INVENTION

The present invention relates in general to fuel cells and, more particularly, to fuel cells utilizing gaseous reactants and a liquid electrolyte.

Fuel cells are, of course, well known devices for continuously generating electricity upon demand directly by the electrochemical reaction of a fuel and oxidant, normally supplied to the cell from external sources. The basic cell itself comprises two electrodes separated by an electrolyte. Fuel is oxidized at one electrode (anode) surrendering electrons and the oxidant is reduced at the other electrode (cathode) accepting electrons. External wiring provides for a flow of electrons through a load between the respective electrodes, the electrolyte forming an ionic path between the electrodes completing the circuit.

A great number of fuel cell variations are known, both in terms of cell design and structural configuration as well as in reactant, electrolyte and materials of construction. A common characteristic of all fuel cells, however, is the absolute necessity for preventing leakage and inadvertent mixing of the reactant gases both within and external to the cell. The results of such mixing can be catastrophic.

A prime consideration in fuel cell construction is, accordingly, the efficiency and reliability of the reactant gas sealing. Many diverse sealing schemes have been considered and utilized in the past, including the use of gaskets, O-rings and special cell frames, as well as techniques such as welding and brazing. Also included have been additional techniques such as those disclosed by Siebenberg et al. U.S. Pat. No. 3,481,737; Hodgdon, Jr. U.S. Pat. No. 3,484,293; and Tseung British Pat. No. 1,174,765.

In Ser. No. 427,182 filed concurrently herewith in which the present inventor is a coinventor, entitled Gas Seal for Liquid Electrolyte Fuel Cells, Fahle et al, the use of an electrolyte-saturated matrix to form a wet seal is described. The present invention is a variation of the invention described in the copending application.

SUMMARY OF THE INVENTION

The present invention comprises a scheme for reactant gas sealing in fuel cells utilizing a liquid electrolyte, employing the wetting effect of the electrolyte itself to establish a wet seal. It provides means for furnishing uniform support of an electrolyte-saturated matrix between members one of which is interrupted to provide, for example, reactant gas access to the interior of the cell.

DESCRIPTION OF THE PREFERRED EMBODIMENTS

Figure 1:
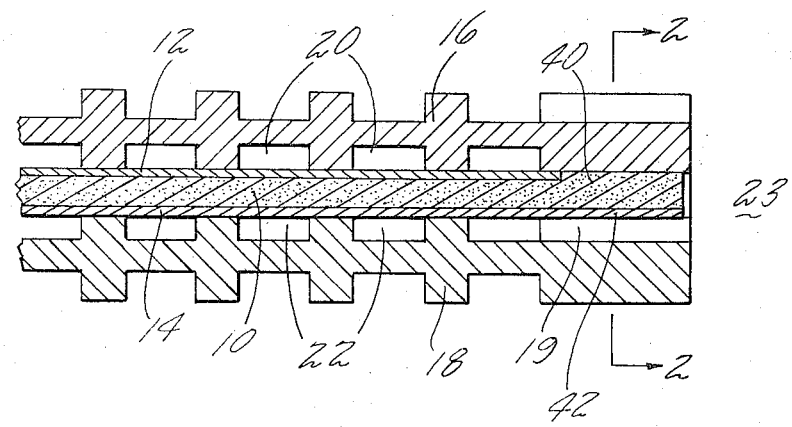
FIG. 1 is a partial cross-sectional view of a simple cell utilizing and sealing according to the present invention.
Figure 2:
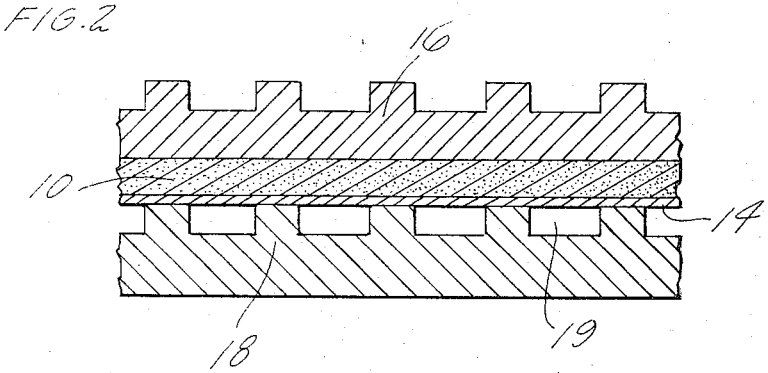
FIG. 2 is an end view of the seal taken along line 2—2 of FIG. 1.

The particular inventon involved here is adapted to use with a wide variety of fuel cell structures, materials and configurations. As such it is susceptible to wide usage and the materials employed in the cells involved display no particular criticality in the context of the invention.

One current fuel cell design is depicted in the drawing. In this cell an electrolyte-saturated matrix 10 is sandwiched between and in contact with fuel cell electrodes 12 and 14. It will be noted particularly that one electrode, electrode 14 as shown in the drawing, is formed to a greater length than the other. The electrode/matrix assembly is in turn confined between a pair of gas separator plates 16 and 18, having a reactant gas access passageway 19 formed therein. The passageway 19 is to provide access from a gas manifold external to the cell to the gas space 22.

The electrodes may be any one of a number of types commonly utilized for electrode purposes in fuel cells, providing there is sufficient rigidity to support the matrix across the passageway 19. In a preferred construction for base cells the electrodes may be a gas porous nickel screen having a catalytic coating or layer thereon on the electrolyte side of the electrodes. In the case of an acid cell, the electrodes may comprise a gas porous carbon sheet carrying the catalytic layer.

The nature of the catalyst depends, of course, upon the particular fuel cell embodiments being utilized. In a fuel cell of the hydrogen/oxygen type utilizing either a base electrolyte such as potassium hydroxide or an acid electrolyte such as phosphoric acid, the platinum group metals have found wide applicability as the catalytic agents. The gas separator plates, which in a preferred embodiment provide electrical continuity between the individual cells in a fuel cell stack in addition to their gas containment function, may be formed of nickel and carbon, respectively in the base and acid cells.

The matrix material is necessary hydrophilic and preferably of relatively small pore size. Also, it is preferably somewhat compressible to permit intimate contact with the surfaces to be sealed. Its essential characteristics relate to its ability to be impregnated with and to retain electrolyte by capillary action. Asbestos cloth is one matrix material which has gained some acceptance in base fuel cells which fibrous organic polymer mats have been used in acid cells.

In the embodiment shown, the electrolyte-saturated matrix is caused to serve a number of functions. It is, of course, the electrolyte carrier in the cell. Additionally, it serves as the gas barrier between the fuel in the space 20 between the anode 12 and the separator 16 and the oxidant in the space 22 between the cathode 14 and the separator 18.

In the embodiment shown in the drawing, the passageway 19 serves as the communication between area 22 and an external manifold area 23. The gas leakage to be prevented here is along surface 40 at the end of separator 16. Accordingly, on this side of the assembly the electrode 12 is terminated short of the end of the matrix to permit matrix/separator contact against the surface 40.

The matrix, however, requires support at surface 42, where it bridges the passageways 19, in order to provide a sealing force against the surface 40. Accordingly, the electrode 14 is extended across area 42 and is utilized for the support of the matrix in this area. Gas leakage along the surface 42 is not critical because the gas in space 22 and that in the manifold area 23 is, of course, the same.

The matrix as saturated with electrolyte forms an effective capillary seal impermeable to the passage of low pressure reactant gases. The electrolyte wetting the surface 40 of the separator prevents the leakage of gas thereby. If the separator itself is not inherently wettable, the surface 40 thereof may be appropriately treated or coated to provide such wettability.

The differential pressure capability of the matrix in its sealing function is governed by capillary forces which in turn are a function of the particular matrix material involved including its porosity and pore size, the type and temperature of the electrolyte affecting viscosity, and the type and surface condition of the surfaces being sealed by contact therewith. The wet seal afforded by the saturated matrix has been demonstrated to form an effective barrier to the passage of low pressure reactant gases in many hours of cell operating time.

The real value of the invention disclosed resides in its inherent simplicity. No excessive expense is involved at assembly nor are special component manufacturing problems introduced.

Although the invention has been disclosed in connection with certain preferred embodiments, obvious alternatives and improvements will be evident to those skilled in the art within the true scope of the invention as set forth in the following claims.

What is claimed is:

1. A fuel cell assembly for fuel cells utilizing gaseous reactants and a liquid electrolyte which comprises:

a pair of gas-porous fuel cell electrodes each having an inner and outer surface, the inner surface comprising a catalytic layer, one electrode being positioned to extend beyond the other;

an electrolyte-saturated matrix sandwiched between the inner surfaces of the electrodes and in contact therewith, the matrix having an end portion substantially coextensive in length with a first of the electrodes and extending beyond the second of the electrodes;

and a pair of gas separators, one positioned outwardly of each electrode defining a first gas space between the first of the electrodes and one separator and a second gas space between the second of the electrodes and the other separator, the surface of the separator confronting the first of the electrodes being formed with a gas passageway therein between the first gas space and the exterior of the cell assembly, the matrix being sandwiched between the ends of the separators in direct contact with the separator adjacent the second electrode, the first electrode being interposed between the matrix and the other separator;

the electrolyte in the matrix forming a wet seal between the matrix and the separator adjacent the second electrode preventing the escape of gas thereby.

2. The assembly according to claim 1 wherein:

the electrolyte is a strong base; and the reactive elements of the gaseous reactants are hydrogen and oxygen.

* * * * *